United States Patent
Rosca et al.

(10) Patent No.: US 10,484,476 B2
(45) Date of Patent: Nov. 19, 2019

(54) DISTRIBUTED DATA MANAGEMENT SYSTEMS FOR EMBEDDED CONTROLLERS

(71) Applicant: Siemens Aktiengesellschaft, Munich (DE)

(72) Inventors: Bogdan Rosca, King of Prussia, PA (US); Bernardo Hermont, Monmouth Junction, NJ (US); Sindhu Suresh, Monroe Twp., NJ (US)

(73) Assignee: Siemens Aktiengesellschaft, Munich (DE)

( * ) Notice: Subject to any disclaimer, the term of this patent is extended or adjusted under 35 U.S.C. 154(b) by 106 days.

(21) Appl. No.: 15/551,792

(22) PCT Filed: Feb. 23, 2015

(86) PCT No.: PCT/US2015/017019
§ 371 (c)(1),
(2) Date: Aug. 17, 2017

(87) PCT Pub. No.: WO2016/137427
PCT Pub. Date: Sep. 1, 2016

(65) Prior Publication Data
US 2018/0041582 A1    Feb. 8, 2018

(51) Int. Cl.
*H04L 29/08*    (2006.01)
*G06F 16/27*    (2019.01)
(Continued)

(52) U.S. Cl.
CPC ............ *H04L 67/12* (2013.01); *G05B 19/418* (2013.01); *G05B 19/4185* (2013.01);
(Continued)

(58) Field of Classification Search
CPC ............ H04L 12/2803; H04L 12/2823; H04L 12/2827; H04L 12/283; H04L 12/2838; H04L 29/08414; H04L 29/08558; H04L 61/6081; H04L 67/12; H04L 67/10; G05B 19/418; G05B 19/4185–41865;
(Continued)

(56) References Cited

U.S. PATENT DOCUMENTS 6,138,049 A * 10/2000 McLaughlin .... G05B 19/41855
                                                                700/67
6,505,247 B1    1/2003 Steger et al.
(Continued)

OTHER PUBLICATIONS

International Search Report received Jan. 7, 2016; International Application No. PCT/US2015/017019; Filing Date: Feb. 23, 2015; 15-pages.

*Primary Examiner* — Brendan Y Higa

(57) ABSTRACT

A system for managing data in an industrial production environment includes a distributed database system stored on a plurality of embedded controller devices. Each respective embedded controller device comprises: a distributed database instance and a database management application. The distributed database instance is configured to store data collected from the industrial production environment by the respective embedded controller device. The database management application is configured to facilitate distributed queries and transactions on the plurality of embedded controller devices.

17 Claims, 5 Drawing Sheets

(51) Int. Cl.
    *G06F 16/25*     (2019.01)
    *H04W 4/38*     (2018.01)
    *G05B 19/418*     (2006.01)

(52) U.S. Cl.
    CPC .............. *G06F 16/25* (2019.01); *G06F 16/27* (2019.01); *H04L 29/08558* (2013.01); *H04L 67/10* (2013.01); *H04W 4/38* (2018.02); *G05B 2219/00* (2013.01); *G05B 2219/1137* (2013.01); *G05B 2219/31323* (2013.01); *Y02P 90/24* (2015.11)

(58) Field of Classification Search
    CPC ............ G05B 2219/00; G05B 2219/10; G05B 2219/11; G05B 2219/1123; G05B 2219/1137; G05B 2219/12–1214; G06F 16/25; G06F 16/27; H04W 4/38
    See application file for complete search history.

(56) References Cited

U.S. PATENT DOCUMENTS

| | | | |
|---|---|---|---|
| 2006/0259160 A1* | 11/2006 | Hood | G05B 19/4188 |
| | | | 700/20 |
| 2007/0075128 A1* | 4/2007 | Hall | G06F 16/27 |
| | | | 235/376 |
| 2008/0215609 A1 | 9/2008 | Cleveland et al. | |
| 2014/0025704 A1* | 1/2014 | Jin | G06F 11/1458 |
| | | | 707/770 |
| 2014/0156632 A1* | 6/2014 | Yu | G06F 16/24545 |
| | | | 707/713 |
| 2016/0142475 A1* | 5/2016 | Kathuria | H04L 67/1008 |
| | | | 709/203 |
| 2017/0038754 A1* | 2/2017 | Lo | G05B 19/05 |
| 2018/0176664 A1* | 6/2018 | Damaggio | H04Q 9/00 |

\* cited by examiner

DISTRIBUTED DATA MANAGEMENT SYSTEMS FOR EMBEDDED CONTROLLERS

This application is a national phase filing under 35 U.S.C. § 371 of International Patent Application No. PCT/US2015/017019, filed Feb. 23, 2015, which is incorporated herein by reference in its entirety.

TECHNICAL FIELD

The present disclosure relates to a distributed data management system for embedded controllers. The various systems and methods may be applied to industrial automation applications, as well as various other applications where embedded controllers are used.

BACKGROUND

Conventional industrial computing environments are organized in a multi-layer architecture wherein data is collected by devices such as programmable logic controllers at a control layer. This data is then passed up through one or more higher layers for analysis and storage at a management layer. The data transfer required by this architecture is significant because data corresponding to potentially millions of sample points must be transferred between the layers. Thus, the bandwidth of the network connecting the layers provides bottleneck for how much data can between analyzed and stored. Additionally, the transfer of data between the layers reduces the visibility and readiness of data which, in turn, limits the effectiveness of extracting insights about the embedded controller's behavior. Moreover, conventional systems do not make use of controller context to obtain deeper analytic insights regarding activity performed by the embedded device, as well as the operational environment. Without such insights, the decision making for the system is inefficient.

Recent advances in control layer devices have addressed some of the inefficiencies of the system by providing enhanced storage and processing capabilities within the device. However, the capabilities are generally underutilized in conventional systems which force the control layer device to fit within the paradigm of the multi-layer architecture discussed above. For example, each control layer device has privileged access to process data (e.g., behaviors) and controller logic. However, only a limited amount of this information can be passed to higher layers due to the bandwidth limitations of the underlying network. Moreover, conventional architectures force all decision making of control layer devices to be centralized at higher layers because each control layer device has no knowledge of the processes or data being generated by its peers.

At a larger scale, today's systems can produce massive amounts of data which can only be handled by parallel computing strategies of which distributed analytics is a key component. In today's systems, distributed analytics at the lower level is not possible since there is no distributed data management as part of industrial automation setup.

SUMMARY

Embodiments of the present invention address and overcome one or more of the above shortcomings and drawbacks, by providing methods, systems, and apparatuses related to a distributed database management system provided by control layer devices such as embedded controllers. The technology described herein is particularly well-suited for, but not limited to, various industrial automation applications.

According to some embodiments, a system for managing data in an industrial production environment includes a distributed database system stored on a plurality of embedded controller devices. Each respective embedded controller device includes a distributed database instance storing data collected from the industrial production environment by the respective embedded controller device and a database management application configured to facilitate distributed queries and transactions on the plurality of embedded controller devices. In one embodiment, the each respective embedded controller device further comprises a programming logic component and a data monitoring module. The programming logic component is configured to collect sensor data generated by one or more sensors in the industrial production environment and generate process data based on the sensor data. The data monitoring module is configured to continuously read the sensor data and the process data from the programming logic component and insert the sensor data and the process data into the distributed database instance associated with the respective embedded controller device. In some embodiments, the system may also include a storage server configured to provide long-term storage of data previously stored on any of the embedded controller devices.

The aforementioned system may be enhanced, refined, or otherwise modified by additional features regarding the modules and components of the embedded controllers used in different embodiments. For example, in one embodiment, each of the plurality of embedded controller devices has an identical data monitoring module. In another embodiment, each embedded controller device includes an interface component configured to provide the data monitoring module with access to the programming logic component used by the respective embedded controller device. In one embodiment, each embedded controller device includes a communication module configured to facilitate network communication between the embedded controller device and each additional embedded controller device.

Sharding techniques may be used by the aforementioned system in some embodiments to provide knowledge of data storage locations. For example, in one embodiment, the system includes a sharding key definition providing a mapping between data stored in the distributed database system and the plurality of embedded controller devices. This sharding key definition may be stored, for example, on each of the plurality of embedded controller devices or a centralized server accessible to each of the plurality of embedded controller devices.

The aforementioned system for managing data in an industrial production environment may be configured to perform a variety of data processing tasks. For example, in some embodiments, each embedded controller device may be configured to respond to queries for data stored locally, or on any of the embedded controller devices included in the system. In some embodiments, the system is configured to perform distributed processing jobs on a dataset stored in the distributed database system. For example, in one embodiment, a distributed processing job is split into a plurality of distributed processing tasks, with each distributed processing task processing a portion of the dataset. Storage location information is determined for each portion of the dataset and the distributed processing tasks are distributed among the embedded controller devices based on the storage location information.

According to another embodiment, a method for managing data in an industrial production environment includes executing, by a first embedded controller, programming logic to generate process data based on sensor data collected from one or more production devices in the industrial production environment. Next, the first embedded controller performs a data monitoring process which includes reading the process data and the sensor data during execution of the programming logic and inserting the process data and the sensor data into a controller database in the first embedded controller which is part of a distributed database stored on the first embedded controller and other embedded controllers. The reading of the process data and the sensor data during execution of the programming logic may be triggered, for example, based on changes to the process data or the sensor data or based on a change to one or more monitored I/O flags. The controller database used to store the data may be, for example, a no-SQL database which has a table equivalent structure.

The aforementioned method may be enhanced, refined, or otherwise modified by additional features in different embodiments. For example, in one embodiment, the first embedded controller receives a database processing request and determines one or more of the second embedded controllers storing portions of the distributed database needed to respond to the database processing request. Next, the first embedded controller transmits a processing instruction to each of the one or more of the plurality of second embedded controllers and receives processed sensor data in response. Then, the first embedded controller creates a response to the database processing request by aggregating the processed sensor data and responds to the database processing request.

Additionally, the method for managing data in an industrial production environment discussed above may include features related to distributed error detection. For example, in one embodiment, the first embedded controller detects an error condition corresponding to an inoperative second embedded controller. The first embedded controller then determines one or more processed data items which were processed by the inoperative second embedded controller to cause the inoperative second embedded controller and generates a data model for identifying the one or more processed data items. When a new data item is received by the first embedded controller, if it is determined to be identical to the processed data items based on the data model, the first embedded controller may discard it. In some embodiments, the first embedded controller sends the data model to other embedded controllers. Thus, these other embedded controllers can likewise discard newly received data, if necessary, based on the data model.

According to another embodiment, a system for managing data in an industrial production environment comprises a plurality of embedded controller devices operably coupled by a data network. Each respective embedded controller device is configured to execute a control process to control operation of one or more production devices in the industrial production environment, store data items related to the control process in a database instance of a distributed database system, and process requests related to any production device in the industrial production environment using the distributed database system.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to a distributed data management system for embedded controllers. By using distributed data management techniques, the need to transport data real time to central location may be minimized or eliminated altogether. Thus, processing logic may be made available where the data is generated. Moreover, the distributed data analytic techniques allow embedded controllers to learn from one another by generating and distributing knowledge throughout the system. The technology described herein may be used for example, to implement a distributed analytic platform at a lower level within an industrial computing architecture utilizing the concept of distributed data management for embedded controllers such as programmable logic controllers (PLCs), microgrid controllers, etc.

Figure 1:
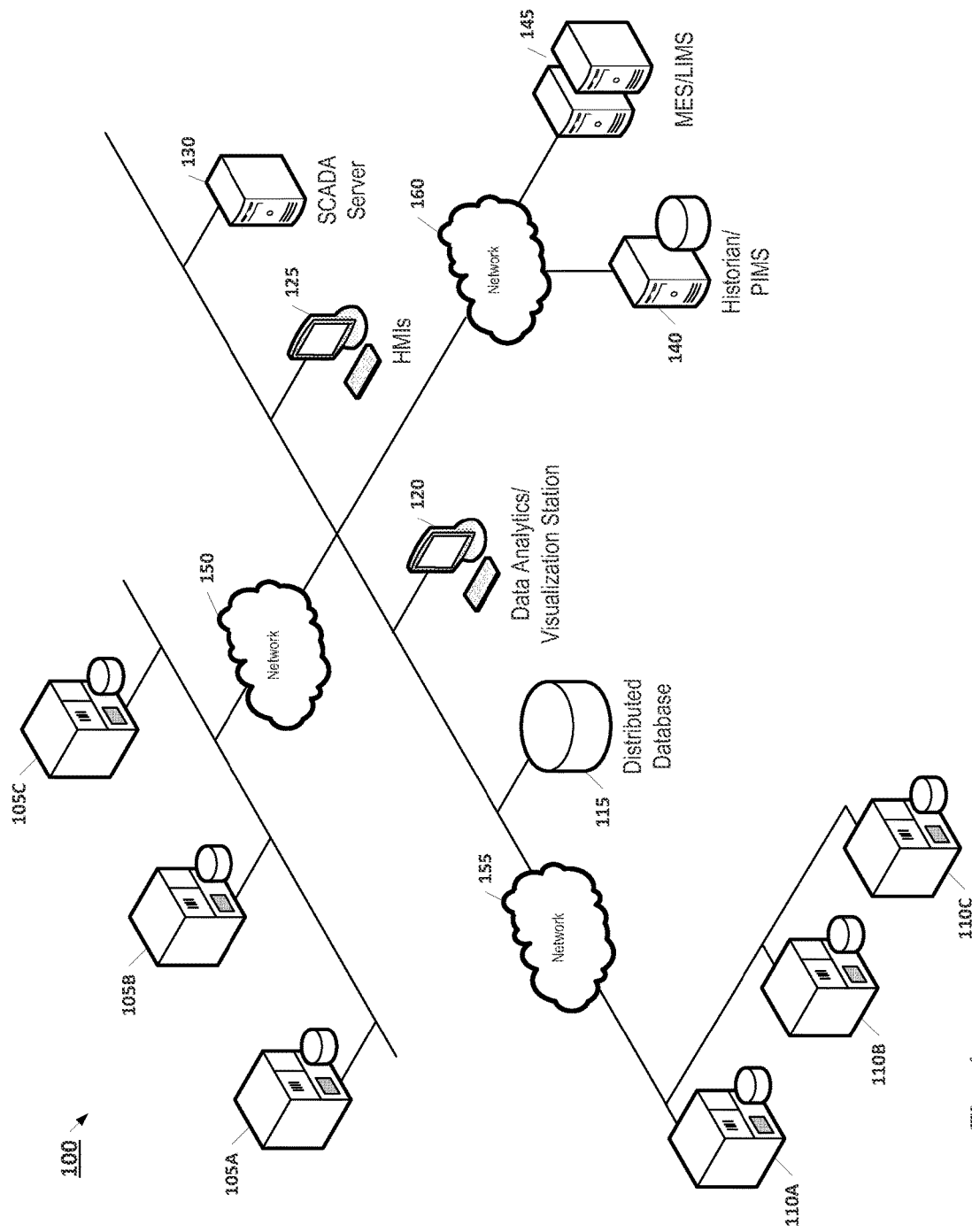
FIG. 1 provides an architecture diagram illustrating an industrial automation system where embedded controllers form a distributed database for storing system data, according to some embodiments of the present invention.

FIG. 1 provides an architecture diagram illustrating an industrial automation system 100 where embedded controllers form a distributed database for storing system data, according to some embodiments of the present invention. The architecture shown in FIG. 1 may be used to implement a robust distributed data management system that has a reduced footprint (i.e., low hardware and software requirements) but a great potential regarding scalability and processing capabilities. It can provide a data management layer that supports querying in a SQL like manner, as an abstraction of a partitioned data access on many nodes, and also functions that can take advantage of data processing locally on nodes where the data resides (i.e., data locality). It should be noted that FIG. 1 represents a high-level, simplified overview of an architecture that may be used with the techniques described herein. This architecture can be modified to include additional devices that may be present in real-world implementations such as, for example, routing devices, connections to additional data networks, etc.

In the example of FIG. 1, the nodes of the distributed database management system employed by the industrial automation system 100 include Embedded Controllers 105A, 105B, 105C, 110A, 110B, and 110C. Although FIG. 1 only shows six embedded controllers, it should be understood that any number of embedded controllers may be used with the techniques described herein. Thus, the distributed database supported by architecture provided in FIG. 1 may dynamically grow and shrink by adding or removing computing resources depending on the system needs. Moreover, the storage capacity of the distributed database management system can be increased by adding dedicated or commodity hardware resources (e.g., server racks, additional controllers). For example, as explained in greater detail below, in some embodiments, a Distributed Database 115 server is added as a node of the distributed database management system to provide long-term storage of data stored on the Embedded Controllers 105A, 105B, 105C, 110A, 110B, and 110C.

Various types of embedded controllers may be used to implement the distributed database management system. For example, in some embodiments, the embedded controllers are programmable logic controllers (PLCs), which are generally known in the art of industrial design. In other embodiments, single board computers such as Raspberry Pi may be used as the embedded controllers. Moreover, various types of controllers may be mixed and matched across the distributed database system.

Each Embedded Controller 105A, 105B, 105C, 110A, 110B, and 110C comprises a distributed database node (represented in FIG. 1 as a small cylinder next to each controller). In some embodiments, the distributed database instance included at each controller is capable of storing data originated from the controller through the same interface into shared memory or on the file system. The data stored at each Embedded Controller 105A, 105B, 105C, 110A, 110B, and 110C may be able to be consumed by client applications that run inside controllers or on any device that has access to the distributed data management system provided by the architecture 100 shown in FIG. 1. In addition to storage, each Embedded Controller 105A, 105B, 105C, 110A, 110B, and 110C may also include cluster management services, and a processing engine, which allows tasks such as distributed storage and communication, as well as distributed processing and coordination. Additional details regarding the implementation of embedded controllers in some embodiments are provided below with respect to FIG. 2.

Each distributed database instance located at each Embedded Controller 105A, 105B, 105C, 110A, 110B may be implemented using various database systems generally known in the art. For example, in some embodiments, the data stored at each controller is stored in a No-SQL database which has a table equivalent structure. As is understood in the art, the term "No-SQL" is used to define a class of data stores that are non-relational in their design. There are various types of No-SQL databases which may be generally grouped according to their underlying data model. These groupings may include databases that use column-based data models (e.g., Cassandra), document-based data models (e.g., MongoDB), key-value based data models (e.g., Redis), and/or graph-based data models (e.g., Allego). Any type of No-SQL database may be used to implement the various embodiments described herein. For example, in one embodiment, MongoDB software is used to provide the underlying functionality of the database used by the systems described herein.

In some embodiments, data is stored on the Embedded Controller 105A, 105B, 105C, 110A, 110B using sharding techniques. As is well understood in the art, sharding is the strategy a distributed database uses for locating its partitioned data. This mechanism is often used to support deployments with data sets that require distribution and high throughput operations. This is done through a sharding key definition that is the criteria used to separate data between controllers. The sharding mapping may be stored by a specific server instance or inside each controller. In both cases, the sharding information is accessible to all devices. Each sharding key holder device can coordinate the data transferring process with other peers, since the sharding metadata holds the data/controller location mapping. This way a distributed database management system (such as the one implemented using Embedded Controller 105A, 105B, 105C, 110A, and 110B) can provide parallelization and low data traffic across the network.

The Embedded Controllers 105A, 105B, 105C, 110A, 110B, and 110C may communicate with one another via network connection using standard networking protocols (e.g., TCP). Such communication may be used, for example, to implement distributed data fetching and distributed processing tasks. In both cases, the process may be initiated from any controller, and the latter will trigger new connections to other controllers that store the needed data. Note that broadcast messages do not need to be sent across the various networks, as only the controllers that have the requested data are targeted by the coordinator (e.g., the controller which started the data fetching or distributed processing task/Map Reduce job), eliminating unnecessary network traffic. Furthermore, if the processing is a distributed processing task, then no data will be passed over the network except the results of the processing. This is achieved by sending the computation code and executing it on the controller that holds the data of interest.

In addition to communicating with one another, Embedded Controllers 105A, 105B, 105C, 110A, 110B, and 110C may also communicate with any other TCP, Open Database Connectivity (ODBC), and/or OPC Unified Architecture (UA) clients such as a Distributed Database 115, a Data Analytics/Visualization Station 120, one or more Human-machine Interfaces (HMIs) 125, a SCADA Server 130, a Historian/PIMs Server 140, and servers 145 associated with Manufacturing Execution Systems (MES) and/or Laboratory Information Management Systems (LIMS). Each component of the architecture may be connected using a local intranet (e.g., implemented via Ethernet) and one or more internets 150, 155, 160.

Distributed Database node 115 is a high capacity storage server that stores data that is no longer available on the Embedded Controllers 105A, 105B, 105C, 110A, 110B, 110C. This data is still available to the distributed database system and behaves just like another distributed node in the system. The Distributed Database 115 may be implemented, for example, using a no-SQL, scalable and fast data storage which can provide real-time distributed long term data access. It may include an ODBC connector just like any other relational database.

Any client station in the industrial automation system 100 can inject algorithms from the Algorithms Store into one or more of the Embedded Controllers 105A, 105B, 105C, 110A, 110B, and 110C. The Embedded Controllers 105A, 105B, 105C, 110A, 110B, 110C may execute the algorithm on a distributed fashion (on multiple controllers) and then aggregate and send the results to the client station. In the example of FIG. 1, a Data Analytics/Visualization Station 120 holds also the Application/Algorithms Store, which can be uploaded and executed on the Embedded Controllers 105A, 105B, 105C, 110A, 110B, and 110C. Additionally, in some embodiments, human-machine interfaces (HMIs) 125 located throughout the production facility may be used to access the distributed database management system, either directly or via the Data Analytics/Visualization Station 120.

In some embodiments, the Data Analytics/Visualization Station 120 may include a graphical user interface (GUI) configured to, for example, receive requests for data stored distributed database management system applications and/or display visualizations related to data stored across the distributed database system. Similar functionality may also be available at the HMIs 125 or other components of the system.

The distributed database management system provided by the Embedded Controllers 105A, 105B, 105C, 110A, 110B, 110C is interoperable with existing automation infrastructure components. For example, the Supervisory Control and Data Acquisition (SCADA) Server 130 can connect and pull distributed data from Embedded Controllers 105A, 105B, 105C, 110A, 110B, 110C as well as other components of the system (e.g., Distributed Database 115) using OPC UA and/or ODBC clients. Similarly the Historian/PIMs Server 140, and servers associated with MES/LIMS 145 may access data across the distributed database management system, with little or no modification to their existing operations. As time and resources allow, these higher-layer components may be modified to more efficiently operate with the distributed database component.

Enabling new or existing controllers to join the distributed database management system can be achieved by simple configurations. Controllers can be delivered with the distributed data management system already installed and deployed or the installation can be done later by use of scripts. Moreover, the proposed solution is horizontally scalable since it is applicable to a number of controllers ranging from one to a ten-thousand controllers. Adding nodes to a distributed and sharded database schema is equivalent to adding more data to a common, partitioned table. The newly added data becomes available to other controllers on the network as soon the new controller, with its database node, is added to an existing system.

Figure 2:
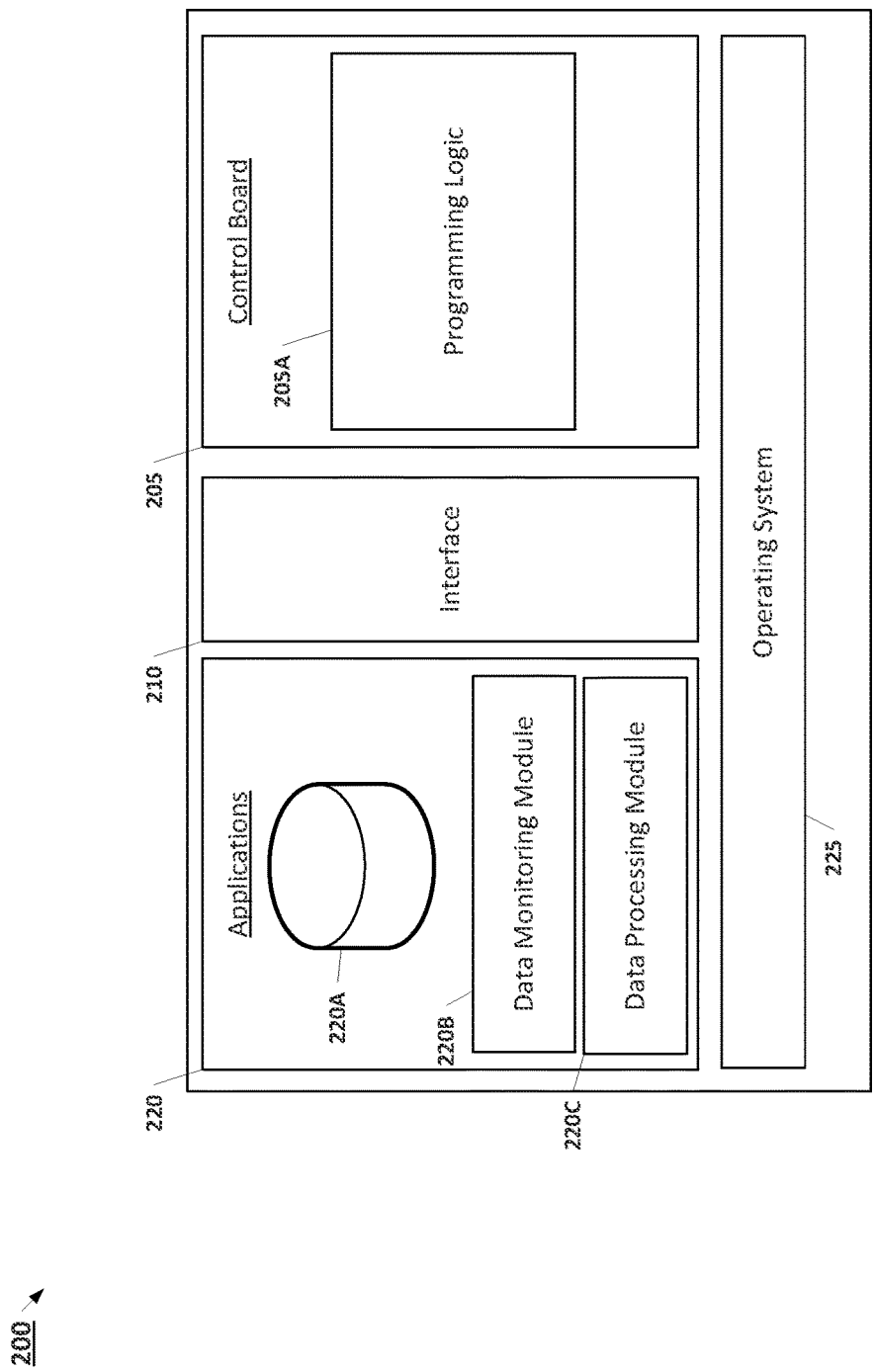
FIG. 2 provides an example illustration of an Embedded Controller that may be used in a distributed data management system, according to some embodiments of the present invention.

FIG. 2 provides an example illustration of an Embedded Controller 200 that may be used in a distributed data management system, according to some embodiments of the present invention. Briefly, the Embedded Controller 200 includes a Control Board 205 communicating with Applications 220 over an Interface 210. The various components of the Embedded Controller 200 execute over an Operating System 225 such as, for example, the Windows Embedded Standard or Linux.

The Control Board 205 includes Programming Logic 205A which is specific to its operating environment. For example, in embodiments where the Embedded Controller 200 is a PLC, the Programming Logic 205A may comprise instructions for managing the operation of a production device. The Applications component 220 of the Embedded Controller 200 includes a Data Monitoring Module 220B, and a Data Processing Module 220C, as well as a database 220A for storing data generated by the Embedded Controller 200 or any device connected thereto. Additionally, the Embedded Controller 200 includes a networking interface (not shown in FIG. 2) which allows the Controller 200 to communicate with external devices.

The Database 220A included in the Embedded Controller 200 stores various data related to any devices connected to the Controller 200, as well as data related to the distributed database system. In some embodiments, data is stored in each controller using a standard format including fields such as controller ID, tag ID, and timestamp values. This favors simplicity, velocity and volume optimization, which fits the controller's capabilities available for this purpose. The storage for each node in the distributed data storage may include internal prefixes and indexes that speed up the scanning processing as a result of queries. As a consistency mechanism, in some embodiments, the database may enforce unique keys and may also override previous values in case a register matches an existing controller, tag, and timestamp values. Data upload may be done internally by each controller, inserting read data through the corresponding interface. The process of reading and writing will occur by event like information changes, monitored I/O flags, etc. The resolution of the stored data may depend on the controller's clock cycle and/or thresholds that can also be configured.

The Data Monitoring Module 220B executes one or more applications for monitoring controller data. Data monitoring applications can be written, for example in any programming language supported by the underlying controller operating system. This makes it easy to adapt to any controllers (embedded code/assembly language) with help of proper adaptors. Additionally, this allows each data monitoring application to communicate to any type of controller by simply changing its adapter to one specific to the targeted device, which may be crucial for supporting existing and/or multi-vendor controller automation infrastructures. In some embodiments, the Data Monitoring Module 220B monitors the context information of the Controller 200 in order to obtain deeper analytic insights about the Controller 200 itself, as well as the other devices included in the Controller's 200 operating environment. This can be done, for example, by detecting changes in process behavior through routines that expose meta information about the controller's logic & responses, which can be used as input to further control logic enhancements. Usually controller misconfigurations are found when the damage is already done. This could be avoided by enabling anomalous behavior detection based on algorithms that can have access to controller logic and also to remaining process data available on other controllers.

The Data Processing Module 220C provides a variety of functions related to the processing of data within the distributed data management system. In some embodiments, this Module 220C executes on a separated processor (not shown in FIG. 2) within the Controller 200. The Data Processing Module 220C may take advantage of the Controller's 200 cached (in-memory) data, which is many times faster than disk access. In some embodiments, the Data Processing Module 220C processes queries for data issued by any of the controllers included in the distributed data management system. In this regard, the Module 220C may allow, for example, ad-hoc SQL queries execution, predefined queries, and also formulas calculation based on controller tags that are served through 220C. Additionally, the Data Processing Module 220C may perform Map Reduce tasks. As is understood in the art, Map Reduce is a programming model for processing and generating large data sets by distributing tasks among a group of nodes. The aggregated results are then returned and saved to further investigation. In addition, other processing can also occur on the client side, e.g. the aggregation of final results extracted from a range of nodes. Thus, the Data Processor Module 220C allows form of parallel processing within the distributed data management system. The exact implementation of Map Reduce will vary depending on the configuration of the distributed database instance implemented on the Controller 200. For example, Map/reduce jobs in MongoDB are JavaScript based and run within a distributed database that may contain sharded data. In some embodiments, jobs and query results can be exported in an intelligible ready to use format, such as tabular, csv, or image.

In some embodiments, data latency is automatically reduced by bringing queries and processing jobs closer to data. This proximity reduces network traffic dramatically, as only the results are transferred through the network and, not the raw data. Connection can be done in the database so that there is no need to move data.

In some embodiments, data access concurrency may occur during simultaneous data access started by one or more clients. Concurrency may be fully supported by the distributed database by multiple-reader, single-writer, and writer-greedy strategies. Thus, there can be an unlimited number of simultaneous readers on the distributed database and write operations blocks reading until they are finished, assuring consistency.

Figure 3:
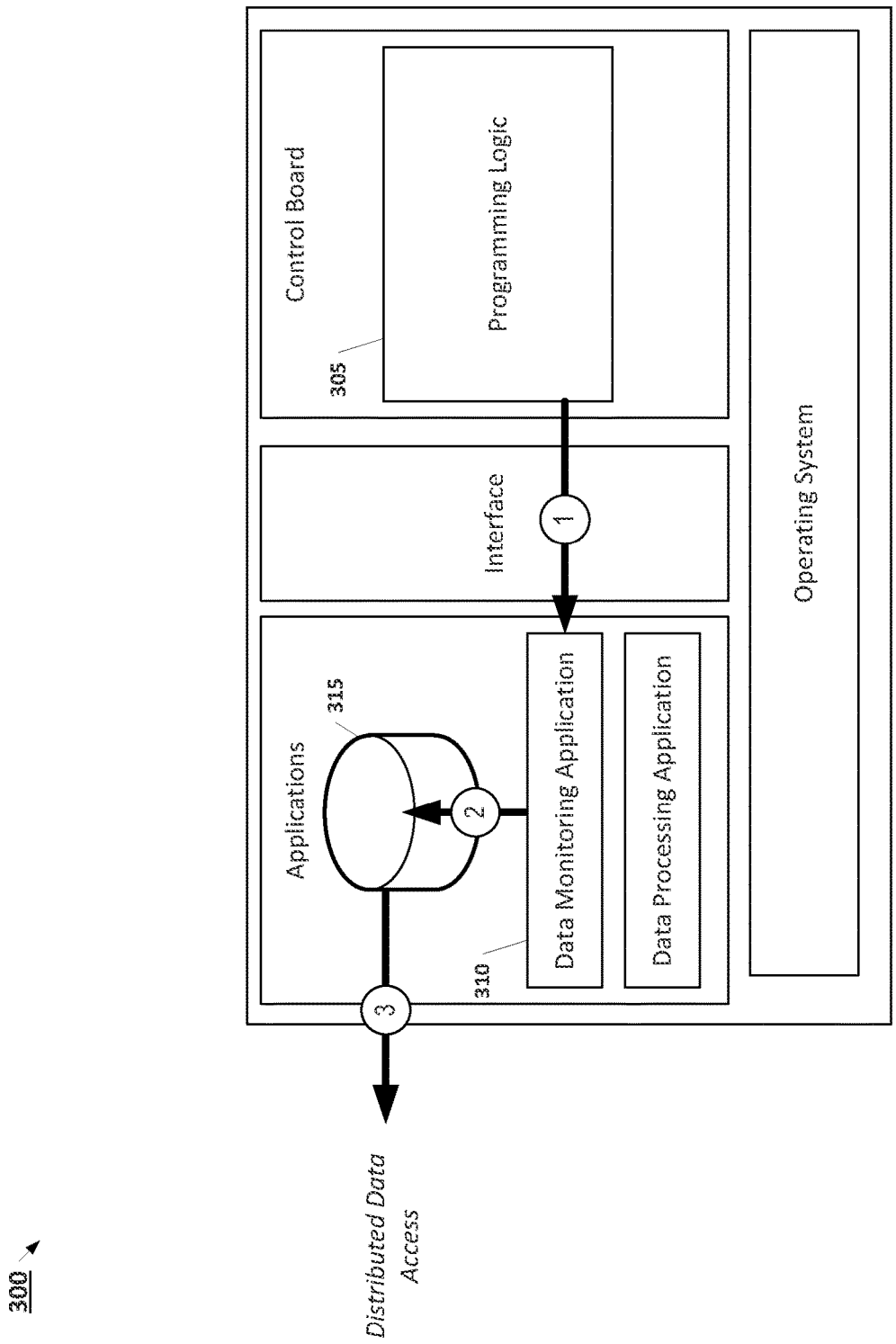
FIG. 3 shows a process for uploading process data to the controller's database, according to some embodiments of the present invention.

FIG. 3 shows a process 300 for uploading local data to the controller's database, according to some embodiments of the present invention. Process and controller data is produced by the Programming Logic 305 is continually read by Data Monitoring Application 310. In FIG. 3, this continual reading is represented by the arrow labeled with the "1" in a circle. At the second step (represented by the arrow labeled "2") the data read by the Data Monitoring Application 310 is inserted into the Controller Database 315. Finally, the data stored in the Controller Database 315 is available for distributed data access, as shown by the arrow labeled "3".

Figure 4:
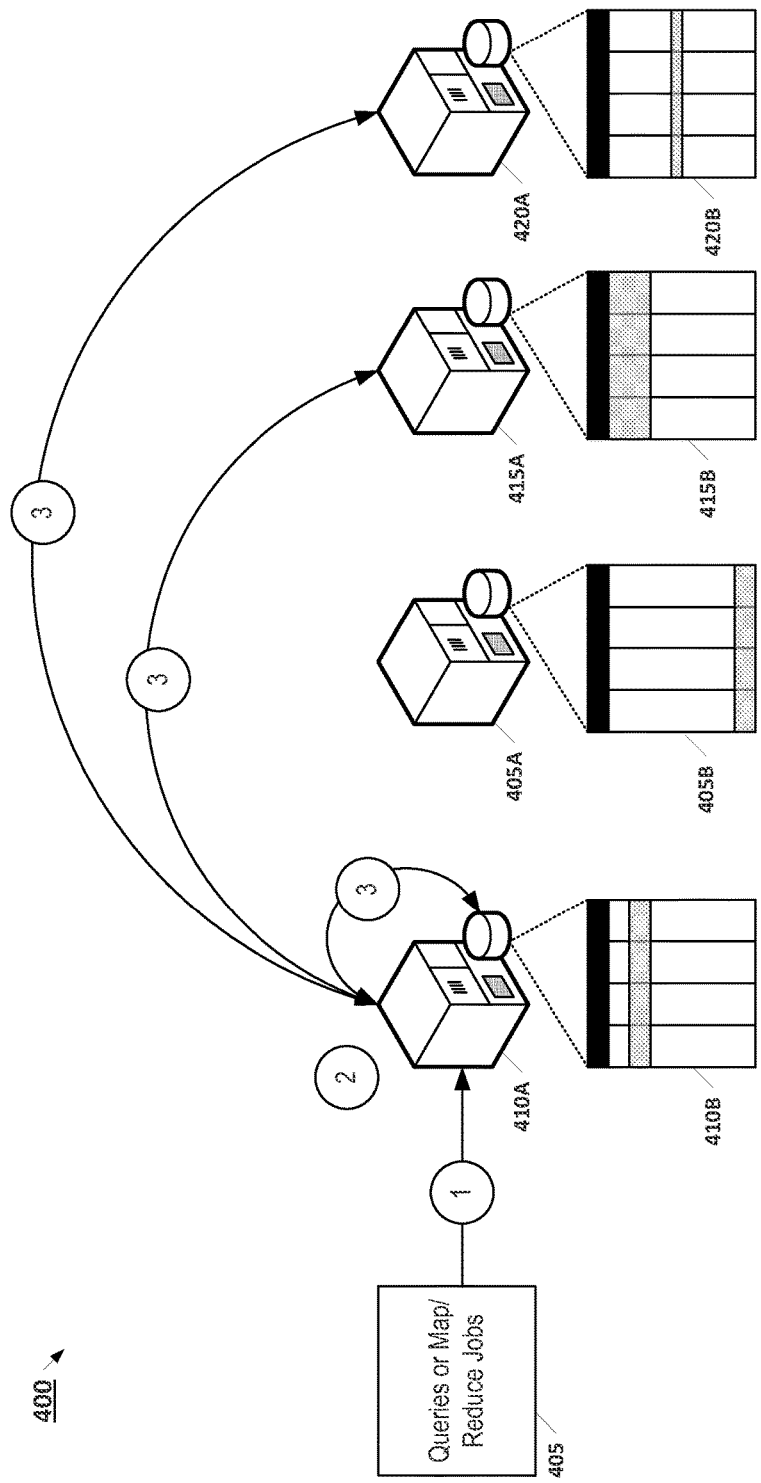
FIG. 4 shows a three-step process for retrieving and processing data within a distributed data management systems, according to some embodiments of the present invention.

FIG. 4 shows a three-step process 400 for retrieving and processing data within a distributed data management systems, according to some embodiments of the present invention. The process 400 begins as Queries or Map/reduce Jobs 405 executes a command on an arbitrary controller. In the example of FIG. 4, this first step is shown as "1" and the arbitrary controller is Controller 410A. The Queries or Map/Reduce Jobs 405 executing the command may be started, for example, by a client machine or any other controller in the system. At the second step (shown as "2" in FIG. 4), the Controller 410A performs a look-up for the data location (either using local data or through communication with a server storing sharding information). Based on the results of this lookup, at the third step (shown as "3" in FIG. 4), the Controller 410A communicates with Controllers 415A and 420A to collect their data subsets 415B and 420B, respectively. Additionally, in this example, the Controller 410A finds a portion of the requested data within its own data subset 405B and retrieves that data accordingly. Note that the Controller 405A does not need to request any data from Controller 410A because the data subset 410B stored at Controller 410A is not needed to respond to the original requests. Once the Controller 410A fetches the data from its own data store and the other controllers 415A and 420A, the Controller 410A processes the collected data to execute the command originally received at the first step of the process 400.

Figure 5:
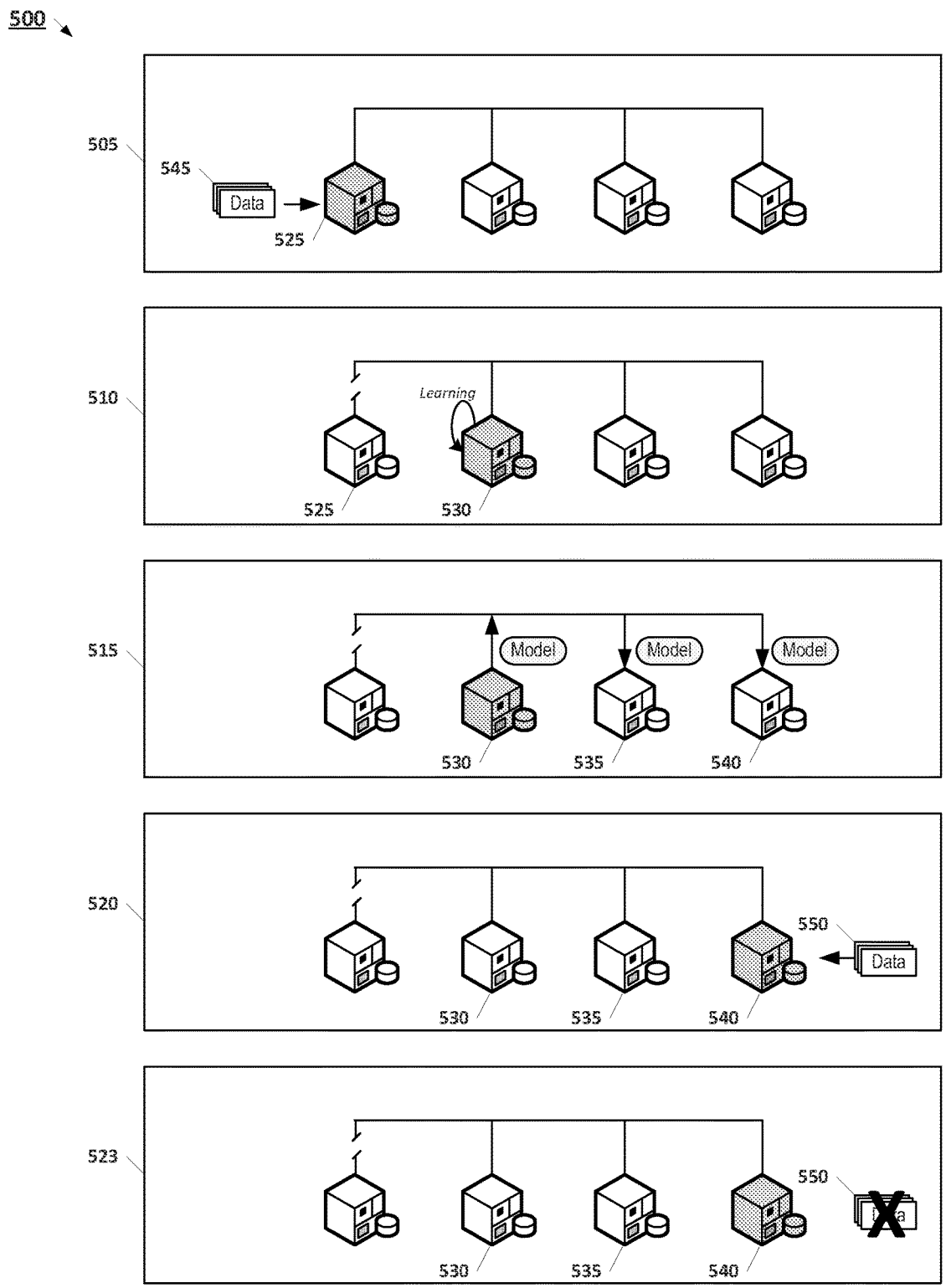
FIG. 5 provides a series of illustrations which show how the Distribute Data Management System described herein can dynamically react to system failures.

FIG. 5 provides a series of illustrations 500 which show how the Distribute Data Management System described herein can dynamically react to system failures. In the first illustration 505, Controller 525 receives Data 545 for processing. Data 545 may be received from an external source or it may be generated by the programming logic of the Controller 535. The second illustration 510 shows that the processing of the Data 545 by Controller 525 has caused the Controller 525 to go offline. For example, the processing of the Data 545 may have caused the Controller 525 to crash due to segmentation fault or memory overflow. Controller 530 detects the failure of Controller 525 and gathers contextualization information regarding the failure. Based on this contextualization information, Controller 530 learns a model for processing similar data in the future. This model may include a set of rules instructing controllers how to respond to data items having particular characteristics. For example, rules may instruct a controller to partially process or discard such data items. Additionally, the rule may instruct the controller to present an alarm on a human-machine interface to notify an operator of a potential issue with the data. In the third illustration 515 the model generated by Controller 530 is distributed to Controller 535 and Controller 540. Next, in the fourth illustration 520, Controller 540 is presented with Data 550 which has similar characteristics to Data 545 that caused Controller 525 to go offline. For example, this Data 550 may be identical to the original Data 545 or it may be received from a source that is known to be corrupted or compromised. At the fifth illustration 523, the Data Monitoring Application of the Controller 540 uses the model received from Controller 530 to discard the Data 550, thus avoiding a failure similar to the one experienced by Controller 525. Over time, the model used by each Controller 530, 535, 540 may be updated (e.g., manually by an operator or through additional learning) such that data which is similar to Data 550 is no longer discarded for processing.

For example, consider a situation where a distributed database management system (designed using the techniques described herein) is used as part of a car manufacturing system. There may be a problem that is undetectable in the existing data infrastructure. For example, operators may determine that a car door is experiencing misalignment defects during the installation process. When the operator examines robot arm, he or she hears a clicking noise and realizes something is wrong with the robot arm that is physical in nature. However, the component that is malfunctioning (e.g., a bearing) is not instrumented in this case. That is, it is not producing data captured by the corresponding embedded controller. A vibration sensor or audio sensor may be added to the robot arm to capture data. However, in conventional systems, this data must then be aggregated with other data stored remotely at the SCADA to fully diagnose the problem. Using the techniques described herein, the distributed database management system may be dynamically adjusted to capture the new data. For example, the vibration sensor or audio sensor may be connected to a laptop running a distributed data management node on itself. A script may be run to add this node into the cluster of the other nodes. Then, the data gathered by vibration sensor or audio sensor is immediately available within the cluster which means that you can employ the analytical functions that are available for the cluster itself.

The techniques described herein are capable of filling the smart data gap that currently exists in the lower control level, which forces raw data to the Process Information Management System (PIMS) level. In addition, the techniques described herein are capable of extracting insights from process data which are not likely to be extracted on upper layers due to their limitations of visibility and availability of data. Awareness of the controller's behavior along with the historic data help the customer enact corrective actions for their industrial processes like tuning the Proportional, Integral & Derivative (PID) control gain or optimizing the operational schedule of the machine, contingency analysis and its impact, etc. In the future, this will help our customers have an automated service where the current state is compared against the base line and corrective actions are communicated either to the service engineers or to the dynamic/supervisory controller which does auto tuning of the control/decision based action, etc.

The processors described herein as used by embedded controllers may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the embedded controllers and related computing infrastructure may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for.

We claim:

1. A system for managing data in an industrial production environment, the system comprising:
    a distributed database system stored on a plurality of embedded controller devices, wherein each respective embedded controller device comprises:
        a distributed database instance configured to store data collected from the industrial production environment by the respective embedded controller device, and
        a database management application configured to facilitate distributed queries and transactions on the plurality of embedded controller devices; and
    a sharding key definition providing a mapping between data stored in the distributed database system and the plurality of embedded controller devices.

2. The system of claim 1, wherein each respective embedded controller device further comprises:
    a data monitoring module having one or more applications executable to continuously read the collected data, and to insert the collected data into the distributed database instance associated with the respective embedded controller device.

3. The system of claim 2, wherein each of the plurality of embedded controller devices has an identical data monitoring module.

4. The system of claim 1, wherein the sharding key definition is stored on each of the plurality of embedded controller devices.

5. The system of claim 1, further comprising:
    a centralized server accessible to each of the plurality of embedded controller devices and configured to store the sharding key definition.

6. The system of claim 1, wherein each respective embedded controller device comprises:
    a networking interface that facilitates network communication between the respective embedded controller device and each additional embedded controller device included in the plurality of embedded controller devices, wherein the network communication uses a standard networking protocol.

7. The system of claim 1, wherein the distributed database system is configured to perform a distributed processing job on a dataset stored in the distributed database system by:
splitting the distributed processing job into a plurality of distributed processing tasks, each distributed processing task processing a portion of the dataset;
determining storage location information for each portion of the dataset;
distributing the plurality of distributed processing tasks among the plurality of embedded controller devices based on the storage location information.

8. The system of claim 1, wherein each respective embedded controller device is configured to respond to queries for data stored on any of the plurality of embedded controller devices.

9. The system of claim 1, further comprising:
a storage server configured to provide long-term storage of data previously stored on one or more of the plurality of embedded controller devices.

10. A method for managing data in an industrial production environment, the method comprising:
executing, by a first embedded controller, programming logic to generate process data based on sensor data collected from one or more production devices in the industrial production environment;
performing, by the first embedded controller, a data monitoring process comprising:
reading, by the first embedded controller, the process data and the sensor data during execution of the programming logic, and
inserting the process data and the sensor data into a controller database in the first embedded controller, wherein the controller database is part of a distributed database stored on the first embedded controller and a plurality of second embedded controllers;
receiving, by the first embedded controller, a database processing request;
determining, by the first embedded controller, one or more of the second embedded controllers storing portions of the distributed database needed to respond to the database processing request;
transmitting, by the first embedded controller, a processing instruction to each of the one or more of the plurality of second embedded controllers;
receiving, by the first embedded controller, processed sensor data from the one or more of the plurality of second embedded controllers in response to the processing instruction;
creating, by the first embedded controller, a response to the database processing request by aggregating the processed sensor data; and
responding, by the first embedded controller, to the database processing request.

11. The method of claim 10, wherein the controller database comprises a no-SQL database which has a table equivalent structure.

12. The method of claim 10, wherein reading of the process data and the sensor data during execution of the programming logic is triggered based on changes to the process data or the sensor data.

13. The method of claim 10, wherein reading of the process data and the sensor data during execution of the programming logic is triggered based on a change to one or more monitored I/O flags.

14. The method of claim 10, further comprising:
detecting, by the first embedded controller, an error condition corresponding to an inoperative second embedded controller included in the plurality of second embedded controllers;
determining, by the first embedded controller, one or more processed data items which were processed by the inoperative second embedded controller to cause the inoperative second embedded controller; and
generating, by the first embedded controller, a data model for identifying the one or more processed data items.

15. The method of claim 14, further comprising:
receiving, by the first embedded controller, a new data item;
identifying, by the first embedded controller, the new data item as identical to the one or more processed data items based on the data model;
discarding, by the first embedded controller, the new data item without processing the new data item.

16. The method of claim 14, further comprising:
sending, by the first embedded controller, the data model to an operative second embedded controller;
receiving, by the operative second embedded controller, a new data item;
identifying, by the operative second embedded controller, the new data item as identical to the one or more processed data items based on the data model;
discarding, by the operative second embedded controller, the new data item without processing the new data item.

17. A method for managing data in an industrial production environment comprising a plurality of embedded controllers, the method comprising:
for each embedded controller in the industrial production environment, inserting sensor data into a controller database in the embedded controller, wherein the controller database is part of a distributed database stored across the plurality of embedded controller;
receiving a database processing request by a first embedded controller included in the plurality of embedded controllers;
determining, by the first embedded controller, one or more of the second embedded controllers storing portions of the distributed database needed to respond to the database processing request;
transmitting, by the first embedded controller, a processing instruction to each of the one or more of the plurality of second embedded controllers;
receiving, by the first embedded controller, processed sensor data from the one or more of the plurality of second embedded controllers in response to the processing instruction;
creating, by the first embedded controller, a response to the database processing request by aggregating the processed sensor data; and
responding, by the first embedded controller, to the database processing request.

* * * * *